United States Patent
Borot et al.

(10) Patent No.: US 8,636,042 B2
(45) Date of Patent: Jan. 28, 2014

(54) TYRE EQUIPPED FOR ATTACHING AN OBJECT TO A WALL THEREOF

(75) Inventors: Martine Borot, Cebazat (FR); Claudio Battocchio, Riom (FR); John David Adamson, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 225 days.

(21) Appl. No.: 12/670,338

(22) PCT Filed: Jul. 21, 2008

(86) PCT No.: PCT/EP2008/059527
§ 371 (c)(1),
(2), (4) Date: Jun. 1, 2010

(87) PCT Pub. No.: WO2009/013269
PCT Pub. Date: Jan. 29, 2009

(65) Prior Publication Data
US 2010/0230024 A1    Sep. 16, 2010

(30) Foreign Application Priority Data

Jul. 24, 2007   (FR) ..................... 07 05386

(51) Int. Cl.
*B60C 19/00* (2006.01)
(52) U.S. Cl.
USPC ....................... 152/152.1; 24/442
(58) Field of Classification Search
USPC ....................... 152/152.1; 24/442
See application file for complete search history.

(56) References Cited

U.S. PATENT DOCUMENTS

| | | | |
|---|---|---|---|
| 3,260,294 A | 7/1966 | Campion | 152/176 |
| 5,974,635 A * | 11/1999 | Murasaki | 24/446 |
| 6,524,415 B1 | 2/2003 | Youngman et al. | 156/123 |
| 6,802,350 B2 * | 10/2004 | Ohura | 152/454 |
| 2003/0155054 A1 * | 8/2003 | Bell | 152/151 |
| 2005/0076992 A1 | 4/2005 | Metcalf et al. | 156/110.1 |

FOREIGN PATENT DOCUMENTS

| | | | |
|---|---|---|---|
| EP | 0 107 0580 A2 | | 1/2001 |
| JP | 2006-044503 | * | 2/2006 |
| WO | WO 03/070496 A1 | | 8/2003 |

OTHER PUBLICATIONS

English machine translation of JP2006-044503, dated Feb. 2006.*

* cited by examiner

*Primary Examiner* — Justin Fischer
*Assistant Examiner* — Robert Dye
(74) *Attorney, Agent, or Firm* — Fitzpatrick, Cella, Harper & Scinto

(57) ABSTRACT

A tire is described that includes a casing defining a cavity and equipped to receive an object, such as an electronic circuit, for example, through use of a two-part attachment, such as a touch-close attachment, of which a first part is fixed to a wall of the casing and a second part can be joined to the first part when placed in contact with the first part to keep the object on the casing in a service position. The first part of the attachment includes connection elements that are an integral part of the wall of the casing of the tire. The connection elements allow these two parts to have freedom to move relative to each other, thereby limiting the transmission of stresses, which affect the wall of the tire, to the object. The connection elements may be loops of flexible thread formed by the extremities of turns of a coiled thread integrated into the wall of the tire during the tire's manufacture.

15 Claims, 2 Drawing Sheets

TYRE EQUIPPED FOR ATTACHING AN OBJECT TO A WALL THEREOF

FIELD OF THE INVENTION

The present invention relates to tyres for vehicle wheels. It relates especially to the attachment to the tyres of associated functional objects. Such objects may be sensors, identification circuits, and/or units capable of communicating with the environment of the tyre, to monitor its operation and the changes in its physical characteristics, or to provide alarms, all these being more or less elaborate functions designed to offer so-called smart tyres to the market.

BACKGROUND

One of the main problems to be solved is how to fit objects in a fixed position in the tyre during sometimes very long periods, which may even be as long as the service life of the tyre, while maintaining the physical and functional integrity of the tyre and of these objects in what is a highly stressful environment, both when the vehicle is moving and when it is at rest, for the tyre so equipped.

The document WO 03/070496 describes an arrangement in which the inside wall of the tyre is covered before curing with a strip of material whose surface is provided with loops, forming one piece of a touch-close attachment of the hook-and-loop type. The other piece of this attachment is provided with hooks capable of engaging in the loops of the first piece when the two pieces are brought together, after the tyre has undergone curing and before it is mounted on a wheel. The object to be installed inside the tyre cavity is attached to the non-hook side of this second piece. According to the aforementioned document, the object can be sandwiched between the faces covered with loops and hooks of the two pieces in order to hold it in the chosen position on the inside wall.

This arrangement, which makes use of a long-familiar technique for removably attaching an object to a tyre, as in U.S. Pat. No. 3,260,294 for example, has the advantage that the object can be removed at any time when the tyre is removed from the wheel, either in order to replace it or to re-use it at the end of the life of the tyre, or to make use of certain data relating to it. However, it suffers from the defect of objects directly integrated into the tyre, since the presence of the first attachment piece of the touch-close attachment on the wall of the tyre interferes with the way in which the tyre deforms when exposed to the stresses which it experiences, both during the manufacture of the tyre, if the latter comprises one or more steps involving shaping the casing, and when the tyre is operated on a moving vehicle, when of course the wall of the tyre is deformed cyclically in each revolution of the wheel and is subjected to additional deformations as it absorbs all the loads and sometimes impacts as it travels over uneven surfaces, sometimes strewn with obstacles such as potholes, stones, kerbs, etc.

BRIEF DESCRIPTION OF THE INVENTION

In the light of these difficulties, the invention aims to provide a way of attaching an object to the inside of a tyre using a touch-close type attachment in a simple manner without significantly interfering with the operation either of the tyre which is to receive it or of the object which is to be attached to it.

In accordance with this aim, a tyre in accordance with one aspect of the invention includes a casing, the wall of which is suitable for withstanding a service pressure after the casing is mounted on a wheel of a vehicle. The wall includes a touch-close type attachment with a first part fixed to the wall and a second part being suitable for joining mechanically to the first part by connection elements that, when applied to the first part, keep an object in a service position inside the tyre. At least some of the connection elements are an integral part of the wall of the casing of the tyre.

In one embodiment, the connection elements of the first part are flexible elongate elements having a portion implanted or embedded directly in the wall of the tyre and another portion or end that projects from this wall, for example into a cavity of the tyre. The connection elements are shaped to join with corresponding connection elements on the second attachment part when the latter is applied to the first part in order to attach the object to the latter.

The flexible elongate elements may be made using flexible threads partially embedded in the wall of the tyre at the site of the first attachment part. In one embodiment, several connection elements may be made from a single thread element, several sectors of which are embedded in the wall of the tyre, separated by sectors that protrude from a surface of the wall.

The flexible elongate elements of the first part may be fastening threads or pins possessing towards one end outside of the wall a head, such as a hook, a barb, or a mushroom of the wall, suitable for gripping a corresponding element on the second attachment part.

Alternatively, the elongate elements of said first attachment part are advantageously formed by flexible threads protruding from the tyre wall in the form of loops whose ends are embedded in the material of the tyre wall. These loops are suitable for being joined to curved flexible threads in the form of hooks, which thus constitute connection elements on the second attachment part. In one advantageous embodiment, these loops each consist of the protruding part of a turn belonging to a coil of flexible thread integrated into the wall of the tyre during manufacture.

Lastly, female connection elements other than loops can be integrated into the tyre wall in accordance with the invention, such as receptacles formed in this wall and suitable for being joined to male elements forming connection elements on the second attachment part.

By means of the connection elements, it is possible to attach the object removably or non-removably to a site on the inside or the outside of the wall, which has been designed and made for this purpose.

The proposed attachment system is very simple because it has few elements foreign to the normal construction of the tyre. It preserves the sector of the wall of the casing to which the object is attached, and in particular allows the wall to deform in its normal operational mode without fatigue or excessive stress. This is because the first part of the attachment offers no resistance to the deforming of the tyre wall during operation because the connection elements integrated within the wall can move freely relative to each other and thus follow the deformations of the wall as it undergoes the stresses to which it is exposed.

The connection elements preferably create a gap between the first and second attachment parts, enabling the parts to limit the transmission to the object of the deformations affecting the first attachment part when the tyre is operated.

To this end, the length of the elongate elements, pins or flexible threads constituting the connection elements, their angle relative to the surface of the attachment parts to which they are joined, and their distribution and density are determined so as to give the attachment freedom of tangential and/or radial movement between faces of the parts in such a way as to prevent or reduce the transmission to the attached object of the deformations affecting the first part of the attachment caused by the stretching, shearing and twisting of the tyre as it rolls. In one advantageous embodiment, in which the connection elements of the first attachment part are loops protruding radially from the surface of the wall of the casing, the necessary gaps are created by adjusting the length of these loops.

This arrangement does not affect the strength of the attachment of the object. Deformations of the first attachment part are essentially absorbed by the flexibility of the connection created between the two parts. The quality of the bond between the connection elements is maintained throughout its use and the object itself is therefore at least largely safe from the mechanical stresses that affect the wall to which it is attached in the highly stressful environment of the rolling tyres in such a way as to satisfy as well as possible the conditions of durability required by the application.

The invention also extends to the making of a second touch-close attachment part, which includes a backing plate for the object to be attached, and connection elements formed integrally with the plate. In one embodiment, the plate is moulded with the object. The connection elements of the second part can then be made as fastening pins that have one end implanted in or integrally formed with the backing plate and the other end provided with a head suitable for gripping a corresponding connection element on the first attachment part.

Lastly, the invention provides a method or methods for making a tyre equipped in accordance with the aspects set forth above.

A method is provided for making a tyre that includes a wall to which an object can be attached using a touch-close attachment, which includes a first attachment part integral with the wall and a second attachment part suitable to be joined mechanically to the first attachment part by connection elements when the first and second attachment parts are brought together to keep the object on the wall. According to the method, during a green assembly of components of the tyre, there is deposited a thread shaped in three dimensions, on a rubber innerliner suitable for placing in contact with a moulding surface, after which the green tyre is cured, this operation being of a nature such that portions of the shaped flexible thread pass through the rubber innerliner so that portions of thread element protrude from the inside surface of the rubber innerliner after demoulding, which act as connection elements for the first attachment part.

In one embodiment the coil is placed against a skim of green rubber—this skim may itself be placed at the edge of a green rubber complex—and assembly is continued by placing the side of the coil furthest from the skim in contact with the rubber innerliner. The skim holds the coil in place during the subsequent assembly operations and the preparation for curing. It is possible with advantage to surface-treat the green skim to give it a certain hardness to tend to prevent the turns of the coil passing through the skim during curing. In a preferred embodiment this treatment of the skim can be done by a process of irradiation.

In one embodiment, the shaped thread is a coil whose turns pass part of the way through the rubber innerliner of the wall to form fastening loops on the inside surface of this wall. In a complementary embodiment, loops formed on the surface of the tyre wall are cut to create hooks which act as connection elements for the first attachment part.

In accordance with another feature, a method of manufacture includes making a second touch-close attachment part, which includes a backing provided with connection elements suitable for joining to a first attachment part fixed to a wall when applied to the first attachment part to secure an object.

According to the method, a layer of a curable material is applied to form a mounting of the backing in a mould, and fastening elements that project from a surface of the backing are attached to the layer of curable material, by a moulding operation, to create the second attachment part. It is advantageous to simultaneously incorporate the object to be installed with the backing or to make such a backing in the manufacturing process, by for example encapsulating the object.

In one implementation of the above method, the mould employed includes a mould body having a moulding cavity for the mounting, an inside face of this cavity being provided with holes that have a curved or enlarged end for forming connection element pins inside the mould body. Curable material is cast or injected into the cavity and the material is cured to produce a movable part provided with connection element pins with curved or enlarged heads.

In an alternative embodiment, the mould employed includes a body having a moulding cavity for mounting with an inside face provided with openings. A flexible connection element pin with a fastening head is inserted into each opening by inserting the head first into the opening. A curable moulding material is cast or injected into the cavity, and the moulding material is cured to produce a movable part provided with male fastening elements.

Other features and advantages of the invention will become clear in the course of the following description given with reference to the appended drawings, which show, by way of non-restrictive examples, various embodiments of the subject matter of the invention.

DESCRIPTION OF EMBODIMENTS OF THE INVENTION

Figure 1:
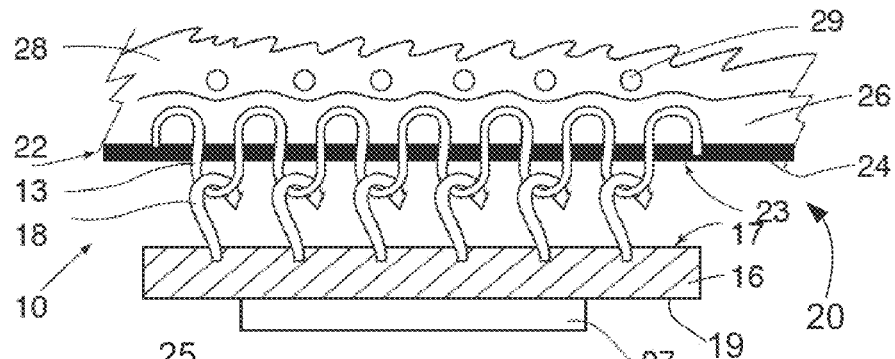
FIG. 1 shows in highly diagrammatic form one example of an embodiment of a wall of a tyre equipped with a touch-close attachment according to the invention.

In FIG. 1, a touch-close attachment 10 has a first part formed integrally in an inside face 23 of a wall 22 of a tyre casing 20. In this example of a tubeless tyre, this wall defines an inflatable cavity 25. It is lined with a rubber innerliner 24 designed to optimize gas tightness with respect to an inflation gas. A carcass ply 28, with reinforcing cables 29 that can be see in cross section, is laid, directly or with one or more intermediate rubber plies 26, behind the rubber innerliner 24.

Fixed into the surface of the rubber innerliner 24 are a number of strong female fastening elements, such as loops 13 made of flexible aramid, polyamide, polyester or other flexible thread, which form a first part of the touch-close attachment 10. The loops 13 are oriented towards an interior of the cavity 25 of the tyre 20 to allow male fastening elements, such as hooks, to attach to them as explained below.

A second part of the attachment 10 is formed of a thin backing or mounting 16, shown in a highly diagrammatic form in FIG. 1, joined to the loops 13 of the first part. One face 17 of the mounting 16, which is turned towards an inside face 23 of the wall 22 of the casing, is provided with male fastening elements such as hooks 18 projecting outwards from the face 17 of the mounting 16. At least some of these are, in the joined position illustrated, engaged in respective loops 13 on the inside face 23 of the wall 22. On the other face 19 of the hook mounting, turned towards the interior of the cavity 25 of the tyre, a functional object is fixed, such as an electronic circuit 27 encapsulated in a protective material. This circuit may perform one or more smart-tyre functions, namely firstly a function of communication that may be active or passive in response to an electrical, magnetic or electromagnetic stimulus. It may also perform measurement functions in the environment, such as temperature and pressure, or more operational measurements relating to stresses affecting the tyre, and dynamic parameters, such as accelerations. It may also, although this list is not exhaustive, perform monitoring or warning functions.

In this case the hooks 18 are made of steel and are implanted in an aramid cloth or knitted fabric forming the mounting 16, these materials being capable of coping suitably with the severe environment found in the tyre cavity, both in terms of pressure and temperature, and to continue doing so for periods which may amount to several years.

It is known that as the wheel rotates, the wall 22 of the tyre deforms cyclically from the instant at which any region on the surface of its tread enters the contact area of the tyre with the ground to the instant it leaves it, and also, to a lesser extent, throughout the rest of the circular path of this region around the wheel axis, until it once again enters the contact area. Moreover, the wall 22 also receives shocks transmitted by irregularities in the road surface over which the wheel is travelling, especially when it meets large obstacles such as humps, stones, potholes, borders of various kinds, and so forth. All these stresses stretch, shear and twist the wall of the tyre. Consequently the points where the loops 13 are implanted in the inside face of the tyre wall 22 may bunch up or move apart as they follow the deformations of the wall 22. It will be observed that they are able to do this without stresses provided the connection between the loops and the hooks 18 is loose enough to allow it to happen without interfering with the deformation of the wall.

Thus, when the tyre casing, which is provided with a first touch-close attachment part integrated into its structure, exits the manufacturing stage, it is a simple matter, either before the tyre is shipped out from the manufacturing site, or at the time it is fitted to a wheel rim, to attach to it the desired functional object depending on the applications for which the tyre is intended. Assembly is carried out by applying and pressing the mounting 16 of the second attachment part 10, with its circuit 27, directly to the first part to cause the hooks or barbs 18 on the second part to engage in the loops 13 of the first part protruding from the wall. For this purpose, the loops 13 are made of a flexible thread that gives them a certain stiffness, enabling them to stand out from the surface of the wall 22 in one position and return to it after being moved away from this position, so that they can be engaged with a high degree of probability by one of the hooks of the second part when the latter is placed in contact with the wall. This last operation can be done by hand or mechanically, especially, in the latter case, if a large application pressure and/or appropriately controlled pressure is required for this purpose, as for example with relatively stiff fastening elements. It has been found that, when the two attachment parts are joined together, it is desirable that they should be capable of withstanding forces tending to separate the object from the wall of up to 10 N/cm$^2$ or more. This criterion offers a good safety margin over the separating forces experienced in operation (notably due to centrifugal force), either at right angles to the wall of the tyre or in shear, by the object and the second part of the touch-close attachment, depending on where on the wall the attachment is positioned.

In this regard, the attachment described here can be made directly in the crown of the wall of the tyre, underneath the tread. In this case, centrifugal force acts compressively, pushing the first and second parts of the attachment 10 closer together. Other stresses which may be large in shear or in separation are the result of cyclical loads applied to the crown of the tyre as it rolls, and stresses transmitted by irregularities in the road surface and impacts with obstacles, as explained above. The object 27 can also be attached in the sidewall of the tyre, on the outside or, more frequently, on the inside. In this position the attachment must then cope with shear forces resulting from centrifugal force and other stresses which develop in the wall of the tyre. Lastly, the object can be located in or near the bead region.

Ordinary industrial touch-close attachments grip very efficiently and leave almost no mechanical play between the two parts of the attachment. Hence, the loads which affect the casing are transmitted almost without loss to the object. If no precaution is taken, there is a risk that the stiffness of the object would prevent the first part of the attachment from deforming and as a result would interfere with the deformations of the casing wall to which it is attached, which is contrary to the aim of the invention described earlier. However, the object itself must withstand sometimes large shear forces transmitted from the wall to the attachment, and the construction and encapsulation of the object should allow for these. In accordance with one advantageous feature, it was realized that it was possible to avoid these risks and create a certain mechanical freedom of play between the first part of the attachment and the second by adjusting certain features of the connection elements between these two parts, such as their length, their flexibility, their angle with respect to the interface between the two parts, or their flexibility or possibly even their inherent elastic properties. In this way a degree of protection is provided for the wall of the casing around the interface and the object 27 is protected from the loads developed in this wall.

Figure 2A:
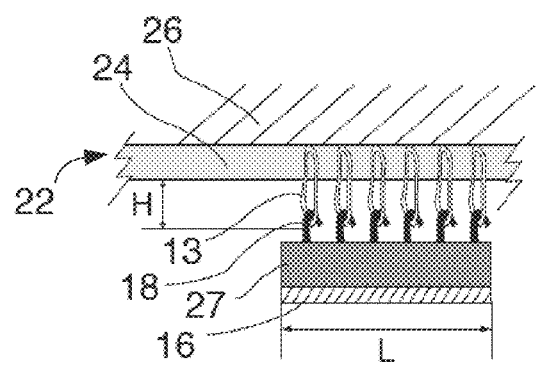
FIGS. 2a and 2b show a mechanism for the operation of the tyre wall according to the invention undergoing deformations during use.
Figure 2B:
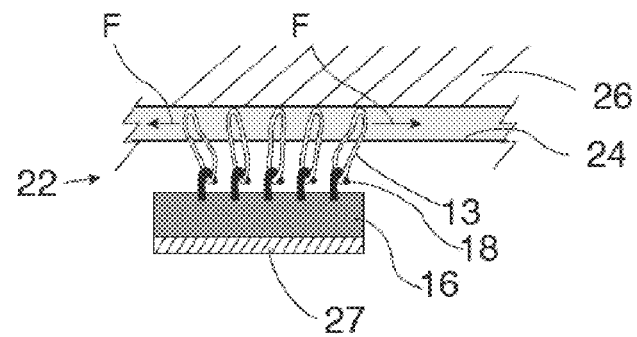

FIGS. 2a and 2b illustrate this mechanism by means of a cross section through the wall of the casing in a plane parallel to the main direction of deformation of this wall. The loops 13 of the attachment 10 have their ends trapped in the wall 22. In the other direction they are engaged by the hooks 18 attached to the mounting 16 which carries the object 27, whose length in the main direction of deformation referred to above is denoted L. In FIG. 2a the wall 22 of the tyre coated with the rubber innerliner 24 is in static equilibrium at a given instant between the inflation pressure and the reaction forces developed by the structure of the tyre casing. The loops 13 have a height H which leaves a visible play, though this is deliberately exaggerated in FIG. 2a, between the wall 22 and the mounting 16.

FIG. 2b illustrates a situation in which the tyre is rolling and the wall 22 encounters a stress produced by one of the causes mentioned earlier, which sets up a tangential elongation indicated by the arrows F. As the figures show in schematic form, the loops implanted at this location pull apart. Being of sufficient height, the stretching out of the loops is compensated for by the fact that they modify their angle by leaning over and at the same time reducing the distance between the wall 22 and the mounting 16. In the process, the tensile stresses affecting the wall 22 of the tyre are not transmitted via the hooks 18 to the mounting 16 or to the object 27.

The aims described earlier can therefore be achieved by adjusting the height of the loops (or one could equally well adjust the length of the hooks) to suit the length of the mounting 16 carrying the object 27. For example, with a mounting of length L equal to 50 millimeters and a loop height H of 5 millimeters, the wall of the tyre can undergo a 10% elongation without affecting the mounting 16 due to an inclination of 30° of the endmost loops 13.

Depending on its construction, the fastening together of the touch-close attachment may be reversible. This allows the functional object to be recovered after installation, either after a relatively brief period of operation in order to make use of data recorded inside the functional object, for example if it is attached to the outside of the sidewall, or when removing the tyre or at the end of its life if it is on the inside, for the purpose of analysis or reuse, as required. It is also possible to make the attachment of the object non-removable once installed in the tyre. Non-reversible touch-close attachments can be used for this purpose, i.e., attachments in which the engagement of male elements such as fish hooks in female elements is non-reversible by construction. Another possibility is to use attachments in which the loops or the hooks are made with synthetic threads whose physical properties are modified after attachment. In the latter case the attachment remains removable until heat is applied locally, for example, enough to raise the temperature of the hooks to cause them to retract in such a way that they can no longer be disengaged from the loops without destroying the attachment.

Figure 3A:
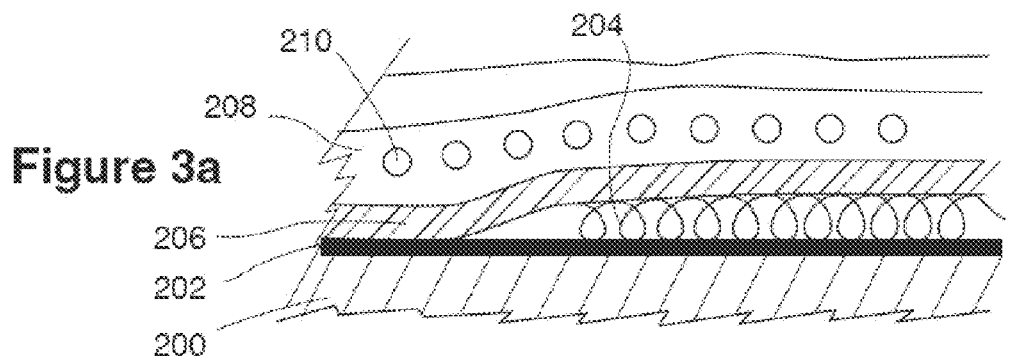
FIGS. 3a and 3b show two steps in the production of a tyre wall that includes touch-close attachment elements with loops anchored directly in the inner wall of the tyre.
Figure 3B:
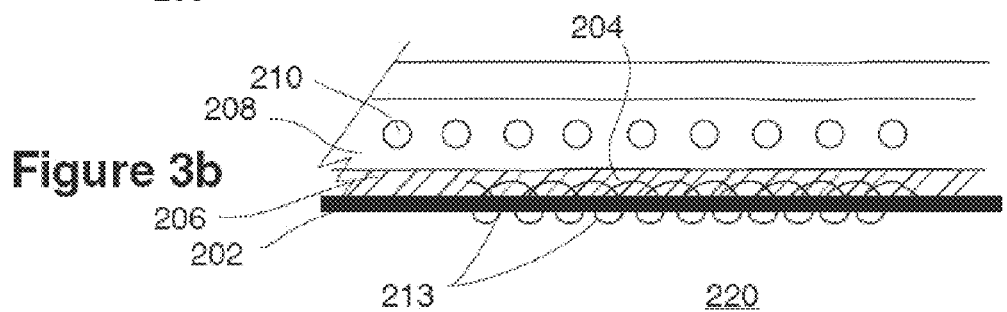

FIGS. 3a and 3b illustrate a method of making a tyre in which the fastening elements of a first part of a touch-close attachment are integrated into its wall for the purpose of carrying out the invention. During green assembly of the tyre components (FIG. 3a), a layer 202 of a sealing rubber is first deposited on an assembly support 200 in a conventional way. A coil 204 of a helical wire of brass-plated steel, whose turns have appropriate dimensions and mechanical properties based on the indications given in the following description, is placed on the layer 202. The coil 204 is covered with a skim, or a thin layer of rubber 206, which may be of the same type as the rubber innerliner 202 which in this case is butyl rubber. A carcass ply 208, the reinforcing cables 210 of which can be seen in cross section, embedded in calendered rubber, is then deposited on the skim. The assembly is completed in the usual way and the preparation of the green tyre is continued to the curing of the green tyre in a curing mould at a pressure of up to 50 bar and a temperature which may be up to 200° C. FIG. 3b shows diagrammatically a cross section through the wall of the now cured tyre, showing the coil of helical wire 204. It can be seen that the turns of the coil 204 have passed part of the way through the rubber innerliner 202 and have emerged on the inside of the tyre cavity 220 in the form of loops 213. Conveniently located on the inside of the tyre wall, these elements can serve as the female attachment for a touch-close connection of the type described earlier. Advantageously, the skim may be given a curing treatment, e.g. by appropriate radiation, to prevent any tendency of the wire coil 204 to penetrate during the curing operation. It should be pointed out that with this setup the resulting fastening elements do not need an independent means of anchorage and will not therefore interfere with the deformations of the tyre wall, either while green or when cured, or degrade the service life of the whole. Moreover, the use of turns of the coil 204 means that it is possible to adjust the length of the resulting loops (or hooks) to obtain the desired play for the purpose in question.

In an alternative embodiment (not shown in the drawings), the portions of turns exposed above the rubber innerliner surface after curing are cut to form male fastening elements, or hooks, suitable for being joined to female elements on an initially removable touch-close attachment part.

Figure 4A:
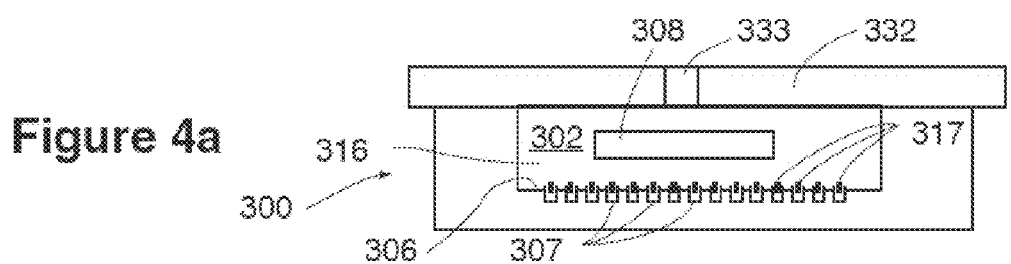
FIGS. 4a and 4b are diagrams showing two alternative embodiments for moulding a second touch-close attachment part provided with hooks.
Figure 4B:
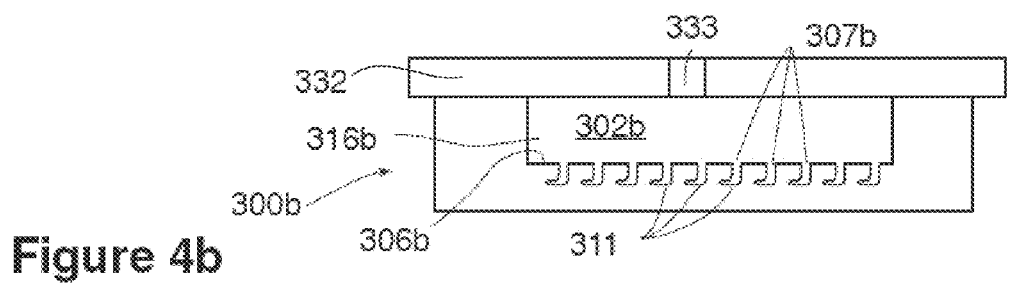

FIGS. 4a and 4b show two embodiments of a second part, or movable part, of a touch-close attachment similar to the attachment 10 shown in FIG. 1, which is not incorporated from the outset in the wall of the tyre. A mould 300 for forming a mounting 316 provided with hooks comprises a mould cavity 302 in the general shape of the mounting 316. One of the main faces of the cavity 302 is closed by a mould cover 332 in which there is an opening 333 for injecting a curable moulding material. The floor 306 of the cavity 302 is interrupted by multiple holes 307. During manufacture, one fastening element 317, consisting of a length of wire with a curved head, is inserted headfirst into each hole 307. Next, an object 308 to be encapsulated is inserted and held in position in the cavity 302, by a means not shown, above the hooks 317. The mould is closed and a curable material is admitted through the injection opening 333 to form, after the moulding reaction, the mounting 316 incorporating the object 308 and provided on one of its main faces with a bed of hooks 317 suitable for inserting into the female elements of the first part of the touch-close attachment in question. Clearly, it is possible with this implementation to vary the length and other properties of the hooks to suit the intentions of the designer of the attachment, bearing in mind among other things the necessity of looseness described above.

FIG. 4b shows an alternative method to FIG. 4a, using a mould 300-b analogous to the mould 300 with the difference that the cavity 302-b has a floor 306-b interrupted by mould holes 307-b (suitably vented), whose ends 311 within the wall of the mould are curved. A curable plastics material injected into the cavity 302-b to form the body of a mounting 316-b of a touch-close attachment also fills the mould holes 311 to form on the surface of the mounting 316-b, after curing, hooks shaped like the holes 311, possessing an appropriate flexibility to allow them to be demoulded and to be joined to the loops of another attachment part (not shown). The method is adaptable of course to the manufacture of fastening pins with mushroom-shaped heads projecting out of the surface of the mounting 316-b.

Clearly, the invention is not limited to the examples described and illustrated herein, and various modifications may be made thereto without departing from the scope defined by the attached claims.

The invention claimed is:

1. A tyre comprising:
   a casing including a wall suitable for withstanding a service pressure after the casing is mounted on a wheel of a vehicle, the wall having an inner side defining an inflatable cavity; and
   touch-close type connection elements each of which includes: a first part fixed to the inner side of the wall, and a second part suitable for joining mechanically to the first part when applied to the first part, to keep an object in a service position inside the tyre,
   wherein the first parts of the connection elements are formed integrally with the wall and extend into the wall,
   wherein the first parts of the connection elements are partially embedded in a ply region of the tyre,
   wherein the first parts of the connection elements are flexible threads implanted in the wall, and
   wherein the first parts of the connection elements project from the wall into the cavity of the tyre.

2. A tyre according to claim 1, wherein the first parts of the connection elements are female type elements and the second parts of the connection elements are male type elements structured to grip and connect with the female type elements.

3. A tyre according to claim 2, wherein the first parts of the connection elements are loops of flexible thread.

4. A tyre according to claim 3, wherein at least one of a length and an angle of the loops of flexible thread allow play between the first and second parts.

5. A tyre according to either of claims 3 and 4, wherein the loops of flexible thread are portions of turns of a coiled thread partially embedded in material forming the wall and protruding from a surface of the wall.

6. A tyre according to claim 2, wherein the female type elements are receptacles formed in a surface of the wall for receiving the male type elements.

7. A tyre according to claim 1, wherein the object is fixed to the second parts of the connection elements, wherein the second parts of the connection elements include a backing plate for the object, and wherein the second parts of the connection elements are formed integrally with the plate.

8. A tyre according to claim 7, wherein the plate is moulded with the object.

9. A tyre according to either of claims 7 and 8, wherein the second parts of the connection elements are fastening pins each having one end implanted in the backing plate and another end provided with a head suitable for gripping a corresponding one of the first parts of the connection elements.

10. A tyre comprising:
   a casing including a wall suitable for withstanding a service pressure after the casing is mounted on a wheel of a vehicle, the wall having an inner side defining an inflatable cavity; and
   touch-close type connection elements each of which includes: a first part fixed to the inner side of the wall, and a second part suitable for joining mechanically to the first part when applied to the first part, to keep an object in a service position inside the tyre,
   wherein the first parts of the connection elements are formed integrally with the wall and extend into the wall,
   wherein the first parts of the connection elements are partially embedded in a ply region of the tyre,
   wherein the first parts of the connection elements are female type elements and the second parts of the connection elements are male type elements structured to grip and connect with the female type elements,
   wherein the first parts of the connection elements are loops of flexible thread,
   wherein the loops of flexible thread are portions of turns of a coiled thread partially embedded in material forming the wall and protruding from a surface of the wall.

11. A tyre according to claim 10, wherein at least one of a length and an angle of the loops of flexible thread allow play between the first and second parts.

12. A tyre according to claim 10, wherein the female type elements are receptacles formed in a surface of the wall for receiving the male type elements.

13. A tyre according to claim 10, wherein the object is fixed to the second parts of the connection elements, wherein the second parts of the connection elements include a backing plate for the object, and wherein the second parts of the connection elements are formed integrally with the plate.

14. A tyre according to claim 13, wherein the plate is moulded with the object.

15. A tyre according to either of claims 13 and 14, wherein the second parts of the connection elements are fastening pins each having one end implanted in the backing plate and another end provided with a head suitable for gripping a corresponding one of the first parts of the connection elements.

* * * * *